United States Patent [19]

Hays et al.

[11] Patent Number: 4,562,046

[45] Date of Patent: Dec. 31, 1985

[54] CATALYTIC CRACKING UNIT

[75] Inventors: George E. Hays; Richard H. Nielsen, both of Bartlesville, Okla.; Chester O. Bowen; Floyd H. Holland, both of Borger, Tex.

[73] Assignee: Phillips Petroleum Company, Bartlesville, Okla.

[21] Appl. No.: 557,552

[22] Filed: Dec. 2, 1983

[51] Int. Cl.[4] .............................................. B01J 8/18
[52] U.S. Cl. .................................. 422/140; 208/157; 422/145; 422/214
[58] Field of Search ............... 422/140, 144, 145, 146, 422/213, 214, 205; 208/127, 157, 158, 159; 239/427.5, 428, 431, 558, 132.3, 132.5; 261/78 A

[56] References Cited

U.S. PATENT DOCUMENTS

| | | | |
|---|---|---|---|
| 2,491,099 | 7/1949 | Fisher | 196/52 |
| 2,654,658 | 10/1953 | Marshall | 422/140 |
| 2,891,000 | 6/1959 | Metrailer | 208/157 |
| 2,891,001 | 6/1959 | Wickham et al. | 208/163 |
| 2,937,988 | 5/1960 | Polack | 208/158 |
| 2,982,718 | 5/1961 | Constantikes | 208/113 |
| 2,985,517 | 5/1961 | Harper | 422/144 |
| 3,042,196 | 7/1962 | Payton et al. | 208/113 |
| 3,071,540 | 1/1963 | McMahon et al. | 208/163 |
| 3,152,065 | 10/1964 | Sharp et al. | 422/140 X |
| 3,161,582 | 12/1964 | Wickham | 208/74 |
| 3,239,205 | 3/1966 | Metz | 239/132.3 |
| 3,243,265 | 3/1966 | Annesser . | |
| 3,473,530 | 10/1969 | Urbanowitz | 261/78 A |
| 3,607,730 | 9/1971 | Pfeiffer | 208/164 |
| 3,654,140 | 4/1972 | Griffel et al. | 208/113 |
| 4,097,243 | 6/1978 | Bartholic . | |
| 4,195,779 | 4/1980 | Auclair et al. | 239/8 |
| 4,310,411 | 1/1982 | Wilkening | 208/153 |
| 4,331,533 | 5/1982 | Dean et al. | 208/113 |
| 4,332,674 | 6/1982 | Dean et al. | 208/120 |
| 4,345,992 | 8/1982 | Washer et al. | 208/153 X |
| 4,427,537 | 1/1984 | Dean et al. | 208/120 |
| 4,434,049 | 2/1984 | Dean et al. | 208/153 |

FOREIGN PATENT DOCUMENTS 0063901 11/1982 European Pat. Off. .
2040993 9/1980 United Kingdom .

OTHER PUBLICATIONS

Hydrocarbon Processing, Apr. 1982, p. 137, FW-Stoic 2 Stage Gasifier.
Hydrocarbon Processing, Apr. 1982, p. 148, W-D/IGI.
Handbook of Fluids in Motion © 1983, Cheremisinoff & Gupta, pp. 803-804.

Primary Examiner—Barry S. Richman
Assistant Examiner—William R. Johnson
Attorney, Agent, or Firm—French and Doescher

[57] ABSTRACT

A mixing chamber for solids and feed such as in a fluidized catalytic cracking unit in which atomized oil is introduced preferably axially in a preferably vertically oriented transfer line or riser reactor from an atomization chamber segregated from flow of cracking catalyst. The cracking catalyst flows with a radially inward component to the mouth of the riser from the circumference thereof and mixes with the oil feed.

29 Claims, 3 Drawing Figures

CATALYTIC CRACKING UNIT

BACKGROUND OF THE INVENTION

In one aspect, the invention relates to a catalytic cracking unit. In another aspect, the invention relates to feeding materials to the riser or transfer line in a fluid catalytic cracking unit.

High boiling oils are difficult to catalytically crack to gasoline range product in existing catalytic cracking operations. There are several reasons for this. The deposition of large amounts of coke on the catalyst will frequently bring the unit up to its coke burning capacity. Coke precursors are more abundant in high boiling oils. Coke laydown is also caused by the deposition of metals on the cracking catalyst that increase the coking tendencies of the catalyst. The troublesome metals become concentrated in the high boiling oils. Coke laydown to a large extent is also influenced by poor vaporization of the oil prior to contact with the catalyst. High boiling oils are difficult to vaporize. Poor mixing between the cracking catalyst and oil feedstock also contributes to coke laydown on the catalyst, as poor mixing can lead to localized high catalyst:oil ratios and overcracking.

Heavy oils include heavy gas oils which generally boil from about 600° F. to 1200° F., and components such as topped crudes and residuum which may have an initial boiling point in excess of 850° F. and an end boiling point in excess of 1200° F. Generally speaking, heavy oils will have an initial boiling point in excess of 500° F. and a 90% overhead point in excess of 1000° F. Heavy gas oils, residuums and hydrotreated residuums are especially difficult to crack to valuable products because their boiling point makes satisfactory vaporization very difficult, their viscosity complicates handling and further complicates vaporization, metal contaminant concentration is usually quite high, the hydrogen:carbon ratio is quite low and the concentration of carbon producing components such as polycyclic aromatics, asphaltenes and the like is very high. Feeds which contain components which have a boiling point in excess of 1050° F.+ are generally considered to be very poor fluid catalytic cracking feeds due to poor conversion to gasoline and lighter components, high coke production and excessive temperature levels in the regenerator.

Heavy oils can be successfully cracked to desirable products where they have been vaporized prior to contact with the catalyst and the catalyst:oil ratio is carefully controlled. With conventional feeds, vaporization is achieved by radiant energy transfer from the hot cracking catalyst to the feed droplets. This type of vaporization mechanism is satisfactory for oils boiling below thermal cracking temperatures which commence at about 850° F. For heavy oils, however, vaporization of large droplets by heat transfer is not completed prior to the onset of thermal cracking and coke formation. Coke laydown is worsened where liquid oil strikes the hot catalyst particles. It would be clearly desirable to provide an apparatus and process to mitigate contact between hot catalyst and liquid oil feed in a catalytic cracking unit.

OBJECTS OF THE INVENTION

It is an object of this invention to provide an apparatus and method for vaporizing a heavy oil feed for a catalytic cracking unit.

It is another object of this invention to provide a method and apparatus for mixing a cracking catalyst and an oil feed in a catalytic cracking unit.

Another object of this invention apparatus and method is to insure dilute phase contact between the catalyst and the oil feed in the catalytic cracking unit without slugging or localized dense phase contact.

It is a further object of this invention to provide a method and apparatus for cracking an oil feed which operates effectively at low throughputs and with different feeds.

It is a further object of this invention to provide a method and apparatus well adapted for fulfilling those objects enumerated above.

SUMMARY OF THE INVENTION

In one aspect, there is provided according to the present invention a mixer for a line reactor such as a riser or transfer line reactor. The apparatus comprises a lift pot having a longitudinal axis, a first, usually upper end, a second, usually lower end, and an interior surface, and a line reactor connected to the first end of the lift pot. The line reactor has a first, usually upper end and a second, usually lower end and the second end of the riser reactor defines a mouth which has a first diameter. A tubular member extends into the lift pot from the second end of the lift pot. The tubular member has a longitudinal axis, a first, usually upper end, an exterior surface, and an interior. There is provided a means for introducing a first material generally longitudinally into the lower end of the riser reactor from the tubular member and a means for introducing a second material into the lower end of the riser reactor from at least substantially the entire circumference of the first diameter from between the tubular member and the lift pot. Where the oil feed is introduced axially into the line reactor, the hot cracking catalyst can be flowed into the oil stream from substantially its entire circumference. By atomizing the oil in the tubular member, contact between hot cracking catalyst and liquid oil droplets can be greatly reduced. By regulating the vertical velocity component of the radially inward flow of cracking catalyst into the oil stream so that it is near the vertical velocity of the oil stream substantially plug flow between cracking catalyst and oil feed can be achieved at the point of mixing to further reduce the probability of contacting liquid oil feed with hot cracking catalyst. By diluting the catalyst with gas prior to introducing it into the mouth of the line reactor dilute phase mixing between the catalyst and oil can be achieved to reduce the possibility of catalyst slugging. These advantages can be readily achieved according to certain other aspects of the present invention by a process which comprises introducing one of the liquid feedstock and the particulate solid generally axially into the mouth of the line reactor and introducing the other of the liquid feedstock in the particulate solid into the mouth of the line reactor from substantially the entire circumference of the mouth of the line reactor. By diluting the particulate solid prior to introducing it into the riser, its vertical velocity component can be adjusted to be about the same as the vertical velocity of the liquid feedstock. In this manner, slippage, which is expressive of the velocity difference between the catalyst and the oil feed, can be greatly reduced and, in the case of a heavy oil cracker, the probability of oil striking hot cracking catalyst particles.

DETAILED DESCRIPTION OF THE INVENTION

Figure 1:
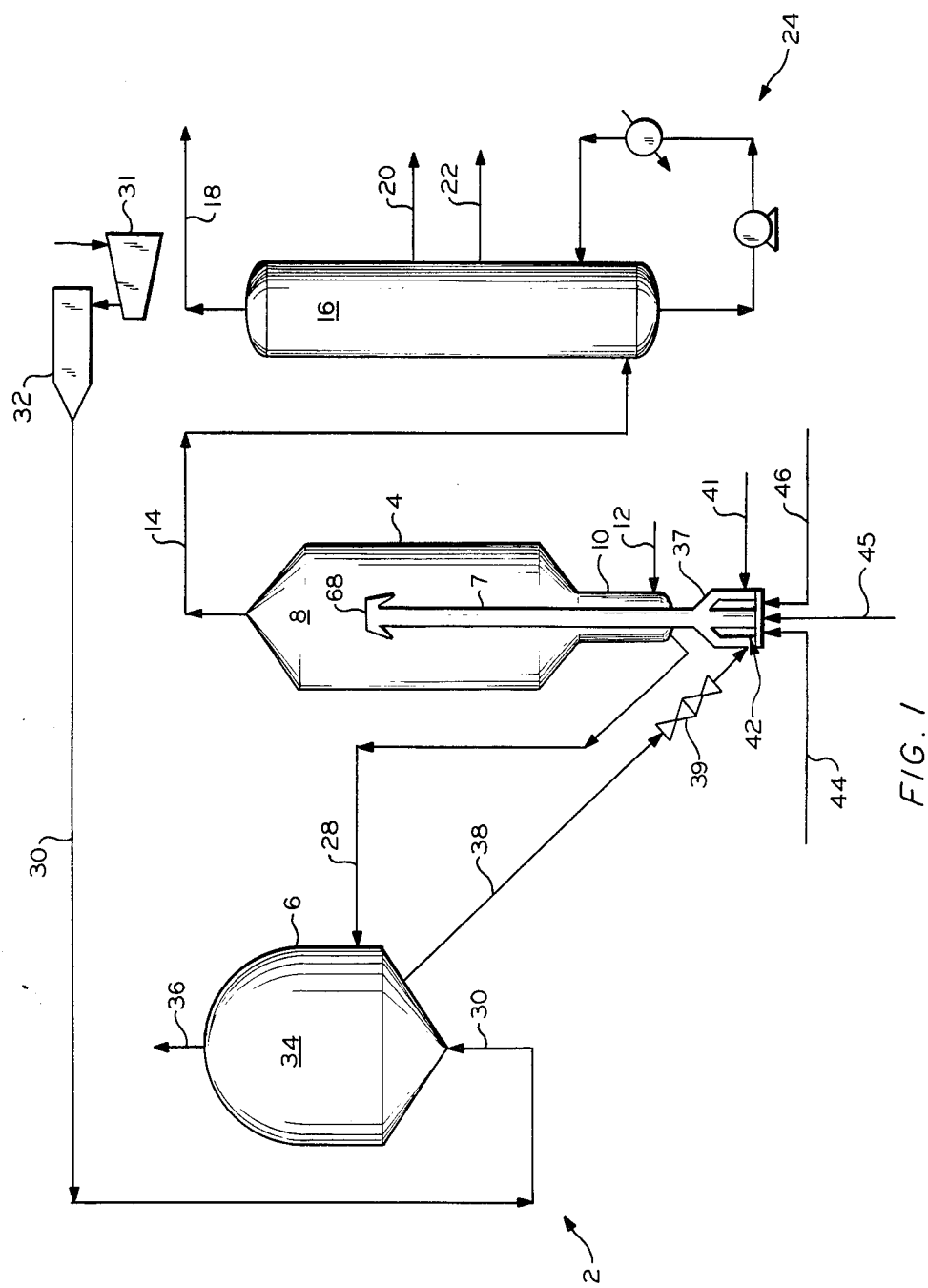
FIG. 1 illustrates schematically certain features of one type of catalytic cracking unit.

With reference to FIG. 1, one type of fluid catalytic cracking unit (FCCU) 2 comprises a reactor 4 and a regenerator 6. The reactor 4 comprises a riser reactor or transfer line reactor 7, a catalyst/product separation zone 8 which usually contains several cyclone separators, and a stripping section or zone 10 in which gas, usually steam such as introduced from line 12, strips entrained hydrocarbon from the coked catalyst, although the invention has applicability to transfer line reactors oriented other than vertically as well. Overhead product from the separation zone 8 is conveyed via line 14 to a separation zone 16 such as the main fractionator where it is separated, for example, into light hydrocarbons which are withdrawn from the zone 16 by the line 18, gasoline range liquids which are withdrawn by the line 20, distillates which are withdrawn by the line 22, and slurry oils, cycle oils, unreacted feed and the like which can be recycled in the recycle means 24 as required.

After being stripped in the zone 10, the cracking catalyst is conveyed from the zone 10 to the regenerator 6 by line 28 for coke burnoff. In the regenerator 6, oxygen containing gas is introduced by a line 30 which is connected to a source of oxygen containing gas such as the air compressor 31 and heater 32. Coke deposits are burned from the catalyst in the regenerator 6 forming an effluent gas which is separated from the catalyst in a separation portion 34 of the regenerator 6 which usually contains a plurality of cyclone separators. These flue gases are withdrawn from the regenerator 6 by the line 36. Hot regenerated catalyst passes from the regenerator 6 to a lift pot 37 at the lower end of the riser reactor 7 by line 38, which provides a source of hot cracking catalyst particles for the riser reactor.

The catalyst flow rate through the cracking unit is controlled by valves 39 which are positioned in the line 38, preferably in a vertical portion thereof.

In the lift pot 37, catalyst from the line 38 is fluidized with a fluidizing gas, usually steam, which is introduced into the lift pot 37 by line 41. The oil feedstock is introduced into the lift pot 37 via a nozzle cartridge assembly 42 which preferably emits a fine mist axially into the riser or transfer line reactor at the lower end thereof. A line 44 connects the nozzle cartridge assembly 42 with a source of heavy oil feedstock in the most preferred embodiment, although the invention can also be used to crack exclusively light oils if desired. A line 45 can then connect the nozzle cartridge assembly with a source of light gas oil, or the like. Atomizing gas such as steam can be added to the nozzle cartridge assembly 42 by line 46 which connects the nozzle cartridge assembly to a steam source.

The operating conditions for the riser reactor 7 and regenerator 6 can be conventional. Usually, the temperature in the riser reactor 7 will be in the range of from about 850° to about 1050° F. The oil is usually admixed with steam at a weight ratio of oil to steam in the range of from about 6:1 to about 25:1. A catalyst oil weight ratio employed in the riser reactor 7 is generally in the range of from about 2:1 to about 30:1, usually between about 3:1 and about 15:1. Pressure in the riser reactor 7 is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser reactor is generally from about 10 to 30 feet per second in the lower portions and up to between about 40 and about 120 feet per second in the upper portions. The contact time between the catalyst and oil in the riser reactor is generally in the range of from about 1 to about 4 seconds, usually from 1.5 to about 3 seconds where the oil is injected into the bottom of the riser. The regenerator is operated at a temperature typically in the range of from about 1100° to about 1500° F. and is ordinarily provided with sufficient oxygen containing gas to reduce the coke on the catalyst to a level of about 0.5 weight percent or less, preferably less than 0.1 weight percent.

Catalysts suitable for catalytic cracking includes silica alumina or silica magnesia synthetic microspheres or ground gels and various natural clay-type or synthetic gel-type catalysts. Most preferably, fluidizable zeolite-containing cracking catalysts are employed. Such catalysts can contain from about 2 to about 20 percent based on total weight of zeolitic material, such as Y-zeolite, dispersed in a silica alumina matrix and have an equilibrium B.E.T. surface area in the range of 25-250 $m^2/g$ and a particle size chiefly in the range of 40 to 80 microns.

Figure 2:
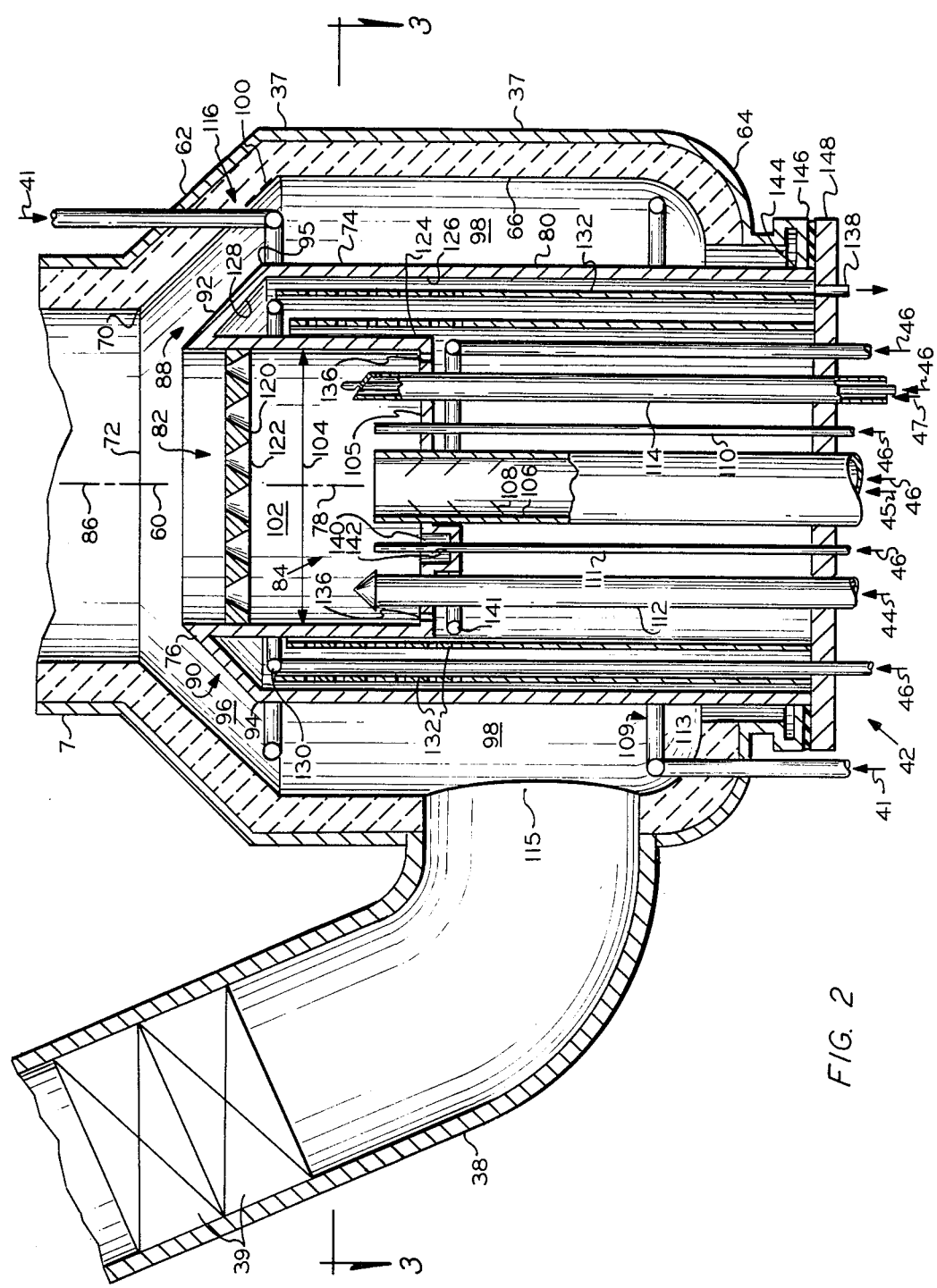
FIG. 2 illustrates schematically certain features of an embodiment of the present invention usefully employed in the system of FIG. 1.
Figure 3:
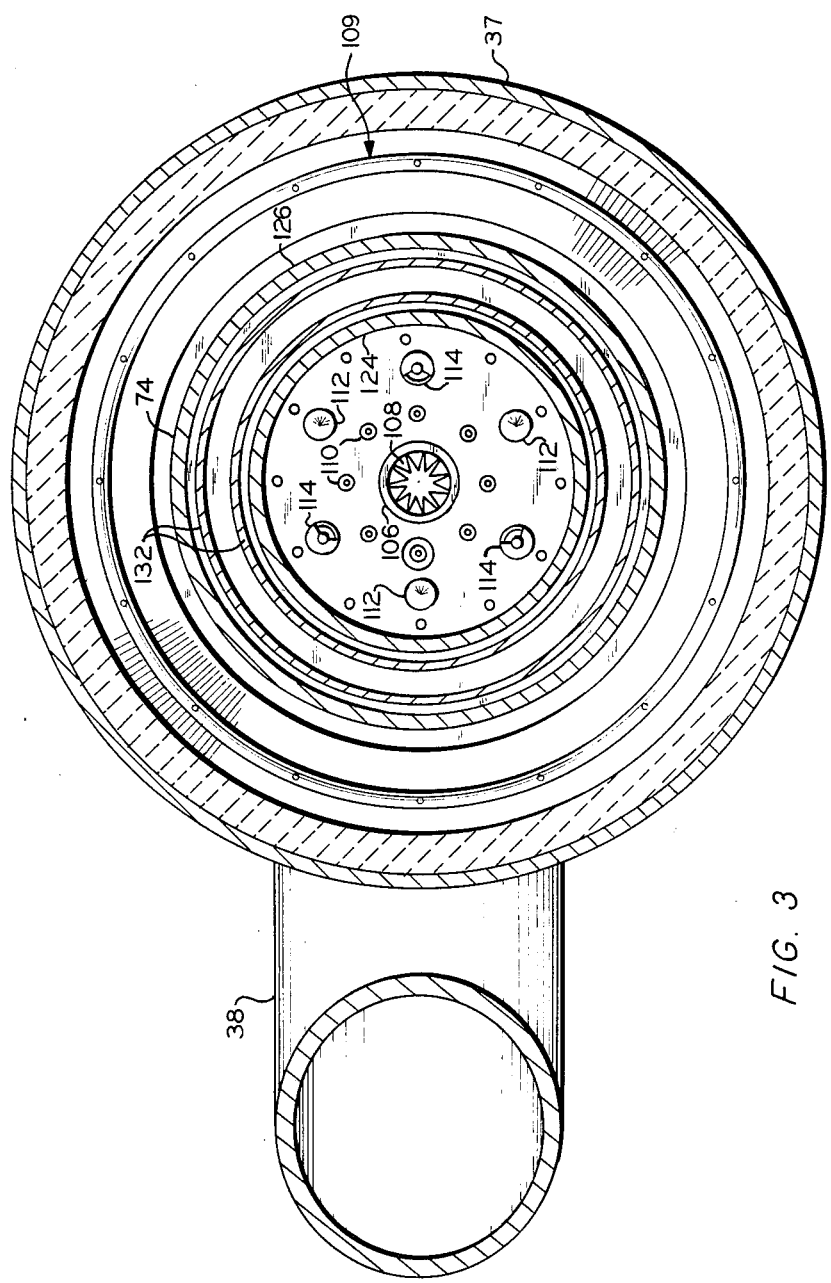
FIG. 3 schematically illustrates a cross section of the apparatus shown in FIG. 2 as would be seen when viewed along indicated lines 3—3.

Referring now particularly to FIGS. 2 and 3, the catalyst lift pot 37 has a longitudinal axis 60, an upper end 62, a lower end 64 and an interior surface 66. Usually, the interior surface 66 will be formed from refractory to resist rapid erosion from the hot catalyst. The riser reactor 7 has an upper end 68 in FIG. 1, a lower end 70 in FIG. 2, with the lower end 70 being connected to the upper end 62 of the lift pot. The lower end 70 of the riser reactor 7 forms a mouth to the riser reactor and defines a diameter illustrated by the numeral 72. The nozzle assembly 42 comprises a tubular member 74 extending into the lift pot 37 from the lower end 64 of the lift pot. The tubular member 74 has an upper end 76, a longitudinal axis 78, an exterior surface 80 and an interior 82 which can be as described in greater detail hereinafter. A means 84 is provided for introducing a first material generally axially into the lower end 70 of the riser reactor 7, along a longitudinal axis 86 thereof. A means 88 is provided for introducing a second material into the lower end 70 of the riser reactor 7 from at least substantially the entire circumference of the first diameter 72. Preferably, the first material comprises an oil feedstock and the means 84 for introducing the first material into the riser reactor 7 is connected to a source of oil feedstock such as via lines 44 and 45. The second material comprises a hot fluidizable cracking catalyst and the means 88 for introducing the second material into the lower portion 70 of the riser 7 is connected to a source of hot fluidizable cracking catalyst such as the regenerator 6 such as via the line 38.

Generally speaking, the means 88 forming the flow path for the hot fluidizable cracking catalyst includes a means 90 at the upper end 76 of the tubular member 74 for defining an upper surface 92 longitudinally spaced beneath the interior surface 66 at the upper end 62 of the catalyst lift pot 37. The upper surface 92 preferably defines a second diameter which can be as measured between points 94 and 95 which is larger than the first diameter 72. In this manner, a catalyst acceleration zone 96 can be defined between the upper surface 92 of the means 90 and the interior surface 66 of upper end 62 of the catalyst lift pot 37. Preferably, the upper end 76 of the tubular member 74 forms the means 90 and the second diameter, although these features could be formed by a flange or the end of a plug in a plug valve, for example.

Preferably, the exterior surface 80 of the tubular member 74 is generally cylindrical in shape and defines the second diameter although other shapes, such as frustoconical, would be very suitable. The interior surface 66 of the catalyst lift pot 37 also has a portion which is generally cylindrical and it defines a third diameter centered about the axis 60 which is preferably concentric with the diameter of the tubular member and the axis 78. In this manner, a catalyst lift chamber 98 is formed between the exterior surface 80 of the tubular member 74 and the interior surface 66 of the lift pot. Preferably, the catalyst lift chamber 98 has a generally annular cross section. The upper end 62 of the catalyst lift pot 37 is preferably formed by a wall 100 defining an inside surface which connects the generally cylindrical interior surface 66 of the catalyst lift pot 37 with the lower end 70 of the riser reactor. The upper end 76 of the tubular member 74 preferably defines a surface which is generally juxtaposed from the wall 100 and forms the means 90 for defining the upper surface longitudinally spaced beneath the upper end 62 of the catalyst lift pot 37. Preferably, the surface defined by means 90 is spaced beneath the inside surface defined by wall 100.

For ease of fabrication and good results, it is preferred that the inside surface of the wall 100 at the upper end 62 of the lift pot 37 connecting the generally cylindrical interior surface 66 of the catalyst lift pot 37 with the lower end 70 of the riser reactor 7 is generally frustoconical in shape. The inside surface of wall 100 preferably converges toward the longitudinal axis 86 of the riser reactor 7 at an angle as measured between the axis 86 and the inside surface of the wall 100 of between about 15 degrees and about 80 degrees. The surface 92 at the upper end 76 of the tubular member 74 is also preferably generally frustoconically shaped and converges toward the longitudinal axis 86 of the riser reactor 7 at an angle as measured between the longitudinal axis 86 and the surface 96 of between about 15 degrees and about 80 degrees. Preferably, the surfaces 96 and 100 converge toward the longitudinal axis 86 of the riser reactor 7 at an angle which is in the range of from about 30 degrees to about 75 degrees. The second diameter which is usually measured adjacent the upper end of the tubular member 74 is generally in the range of from about 1 to about 2 times the first diameter 72 defined by the lower end 70 of the riser. The radial inward component of catalyst velocity and vertical upward component of catalyst velocity can thus be determined easily by selection of the second diameter and the converging angle of the catalyst acceleration zone.

For atomization and vaporization of heavy oil feeds, the inside 82 of the tubular member 74 preferably forms a generally cylindrical atomization chamber 102. The chamber 102 is preferably provided with a fourth diameter 104 which is generally in the range of from about 0.3 to about 1.5, usually about 0.5 to about 1 times the diameter 72 at the mouth of the riser. The length of the atomization chamber 102 is preferably sufficient to provide an oil droplet size of below about 1000 microns. In practice, the desirable length as measured longitudinally for the chamber 102 will depend on steam and oil rates, oil viscosity, oil boiling point, nozzle type, and other parameters. Generally the length of the chamber 102 between the upper end 76 of the tubular member 74 and an atomization chamber end wall 105 spaced apart from the upper end 76 of the tubular member 74 is sufficient to provide the chamber 102 with a length to diameter ratio which is in the range of from about 1:10 to about 10:1, usually in the range of from about 1:3 to about 3:1. Pipes and tubular members preferably extend through the end wall 105 and empty into the atomization chamber 102 for supplying oil and atomization fluid into the chamber 102. Preferably, a central pipe 106 extends through the end wall 105 along the axis 78 thereof and empties into the atomization chamber 102. Turbulence generating members 108 which can be pentagonally shaped can desirably be mounted to the inside of the central pipe 106 for breaking up oil flow along the wall thereof where velocities are high enough to result in annular two-phase flow in the pipe 106. The central pipe 106 is preferably used to introduce gas oils into the chamber 102. A plurality of tubular members 110 can be circumferentially spaced apart around the central pipe 106 for emptying into the atomization chamber 102. Dispersal gas, usually steam, can be added into the chamber 102 through the tubular members 110. To achieve this, a source of atomizing fluid 46 can be connected to the tubular members 110. A source 45 of oil feedstock and a source of atomizing gas 46 can be connected to the central pipe 106. Other tubular members 112 and 114 can be circumferentially spaced apart around the central pipe 106 and extend longitudinally through the end wall 105 to empty into the atomization chamber 102. A source of oil feed 44 or 45 and/or atomizing gas 46 can be connected to these tubular members. In a preferred embodiment, the tubular members 112 carry a topped crude feedstock and are provided with a pressure atomizing nozzle. The tubular members 114 carry slurry oil in the outer tube and steam in the inner tube. The slurry oil is emitted generally axially from the outer tube through a C-shaped slot and is cut or sheared by steam from the inner tube flowing through a slot in the side of the inner tube which is normal to the opening at the end of the outer tube through which the slurry oil flows.

Preferably, the cracking catalyst is fluidized prior to being mixed with the oil feed. For catalyst aeration or fluidization a means 109 is positioned in the catalyst lift chamber 98 for distributing a fluidizing gas such as steam from steam source 41 into the catalyst lift chamber adjacent a lower end 113 of the catalyst lift chamber 98. The line 38 preferably empties into the lift pot 37 through a port 114 through the sidewall of the lift pot opening between the means 109 and the catalyst acceleration zone 96 adjacent the upper end 62 of the lift pot. The means 109 preferably distributes fluidizing gas in the lower portion of the lift pot to start vertically upward flow of the cracking catalyst. More preferably, a second means 16 for distributing a fluidizing gas such as steam from the source 41 is positioned in the catalyst lift chamber 98 at a position adjacent or below the catalyst acceleration zone 96. Usually, the means 109 and 116 will each be formed from an annular distributor having a sidewall with a plurality of ports therethrough which connects its interior with circumferentially spaced apart positions in the catalyst lift chamber 98. The ports through the sidewall of the annular distributor constituting the means 109 can be oriented downwardly or upwardly to lift the catalyst introduced into the catalyst lift chamber 98 via port 115 to the annular distributor constituting the means 116. The ports through the sidewall of the second means 116 will generally be oriented toward the upper end of the riser reactor. In this manner, the cracking catalyst can be conveyed in dilute phase at a desired velocity into the mouth 70 of the riser 7.

For certain applications, it can be desirable to position a partition 120 having a plurality of apertures 122 extending through it across the tubular member 74 between the end wall 105 of the tubular member and the upper end 76 of the tubular member. When the partition 120 is present, it will define the upper end of the atomization chamber 102. The apertures 122 should be relatively small and the partition 120 should be relatively thick. For example, the partition 120 can have a thickness in the range of from about 0.5 to about 10 inches and at least a portion of the apertures can have a diameter in the range of from about 0.05 to about 5 inches. Preferably, the apertures 122 each have a throat and converge from inlet diameter on the side of the atomization chamber 102 which is in the range of from about 0.25 to about 5 inches to a throat diameter which is in the range of from about 0.1 to about 3 inches. Generally speaking, sufficient apertures 122 will be provided so that the total aperture throat cross-sectional area will be in the range of from about 0.05 to about 0.5 times the cross-sectional area of the atomization chamber 102.

For certain other applications, it can be desirable to hollow out the sidewall of the tubular member 74 such as by forming the tubular member 74 by an inner wall member 124, an outer wall member 126 and an end wall member 128. The inner wall member defines the third diameter 104, the outer wall member defines the fourth diameter which can be measured between points 94 and 95 and the end wall member 128 defines the upper end 76 of the tubular member. The end wall 105 of the atomization chamber 102 is defined by a closure across the inside diameter of the inner wall member 124 of the tubular member 74. The biggest advantage to hollowing out the sidewall of the tubular member 74 instead of forming it from a solid material such as refractory is that it can be cooled by a flow of cooling fluid. For example, a source of steam 41 can be connected to the annulus between the inner wall member 124 and the outer wall member 126 so that cooling fluid flows in the annulus by the outer wall member 126 and the end wall 128 which connects the inner wall member 124 and the outer wall member 128. One manner for doing this is to provide an annular fluid distributor 130 having a sidewall and a plurality of ports through its sidewall at spaced apart positions along its length connected to the fluid source 41 and positioned in the annulus between the inner wall 124 and the outer wall 126 at a position closely adjacent the end wall member 128. To further reduce heat penetration from the catalyst lift chamber 98 to the atomization chamber 102, one or more radiation shielding members or baffles 132 can be positioned between the inner wall member 124 and the outer wall member 126. The radiation shielding members 132 provide radiation shielding between the wall members to reduce heat penetration into the atomization chamber 102 and the possibility of coke buildup. The radiation shielding members 132 can be in the form of tubular baffles extending circumferentially around and longitudinally through the annulus between the inner and outer wall members and this arrangement is presently preferred. The tubular baffles 132 are provided with apertures which are preferably radially nonaligned as between adjacent baffles so as to prevent or mitigate heat penetration by radiation. Other types of radiation shielding, such as bronze turnings, raschig rings and the like can be employed if desired. The cooling fluid introduced into the annulus between the inner wall member 124 and the outer wall member 126 can be introduced or exhausted into the riser if desired, such as through a plurality of ports 136 which extend through the end wall 105 defining the lower end of the atomization chamber 102, or they can be withdrawn or exhausted from the cracking unit such as via tube or port 138 which also is positioned in flow communication with the annulus. To further assist in oil dispersal and to shield the inner wall member 124 from oil impingement the ports 136 can open into the atomization chamber 102 through the end wall 105 around the periphery of the atomization chamber 102 closely adjacent to the inner wall member 124, or the steam can leak into the atomization chamber 102 between the feed tubes 112 and 114 and the end wall 105.

To obtain maximal cooling benefit from the fluid introduced into the hollowed-out portion of the tubular member, it is desirable that the fluid first flow past the inner wall member 124 and then the outer wall member 126. To accomplish this, the baffle 132 can be formed as a generally tubular partition positioned in the annulus between the inner wall member 124 and the outer wall member 126 in a spaced-apart position from the end wall 128 at the upper end of the tubular member to form an inner flow path adjacent the inner wall member and an outer flow path adjacent the outer wall member. Communication between the inner flow path and the outer flow path is established adjacent the end wall 128. The source of cooling fluid such as steam source 46 is connected to a lower portion of the inner flow path such as at annular distributor 14. Where the embodiment of the invention using upper distributor 130 is employed, the distributor 14 preferably exhausts directly into the atomization chamber 102.

In further aspects of the present invention, the flow of atomizing gas can be controlled independently of the flow of feed oil. In accordance with this embodiment, there is provided extending through the end wall 105 of the atomization chamber 102 a means for introducing an atomizing fluid consisting essentially of steam into the atomization chamber 102. Generally speaking the means for introducing steam will be formed by a plurality of ducts such as the tubular members 110 and/or the ports 136. Preferably, the ducts will open into the atomization chamber 102 in a geometric array which is concentric with the longitudinal axis 78 of the atomization chamber. Usually, the ducts will be arranged along a circle. In any event, the ducts are connected to the steam source 46 and some means for controlling the flow of steam through the ducts, such as a valve, is provided in the steam line. The ducts should be positioned sufficiently close to the pipe 106 and oriented to help atomize the liquid which issues from the pipe 106.

In the event that liquid accumulation on the end wall 105 becomes a problem, a sump 140 can be recessed from the atomization chamber 102 into the end wall 105 of the atomization chamber 102 and the end wall 105 formed so that liquids accumulated thereon will flow into the sump 140. From the sump 140, accumulated liquids can be withdrawn from the cracking unit by means not shown or reatomized by a means associated with the sump 140 for atomizing accumulated liquids therein. In one embodiment, the means associated with the sump for atomizing accumulate liquids comprises a duct or port 142 opening into the sump 140 which is connected to the steam source 46 such as by a tubular member 111. Preferably, the tubular member 111 extends through the end wall 105 and into the atomization chamber 102 through the sump and has a sidewall which defines the port 142. The port 142 is located in the sump 140 so that liquids are aspirated out of the sump and emitted from the end of the tubular member in admixture with steam into the atomization chamber 102.

For maintenance purposes, it is very desirable that the assembly 42 be removable as a unit. One manner of providing for this is to form the lift pot 37 with a port 144 at its lower end adapted for receiving the generally cylindrical exterior surface 80 of the tubular member. A generally annular flange 146 is positioned around the port. The generally cylindrical exterior surface 80 of the tubular member is provided with a generally annular flange 148 mounted thereon sealingly contacting the generally annular flange 146 at the lower end of the lift pot.

According to certain further aspects of the present invention, there is provided a method for mixing a particulate solid, usually a cracking catalyst and a liquid feedstock, usually an oil. The method comprises introducing one of the liquid feedstock and the particulate solid generally axially into the mouth of a line reactor, and introducing the other of the liquid feedstock and the particulate solid into the mouth of the line reactor from substantially the entire circumference of the mouth of the line reactor. Preferably, a liquid oil feedstock is introduced generally axially into the mouth of a rise reactor and a fluidized particulate cracking catalyst is introduced into the mouth of the riser from substantially the entire circumference of the mouth of the riser. Usually, each of the liquid oil feedstock and the particulate catalyst will be in admixture with atomizing and fluidizing gas respectively, usually steam in both instances. In order to reduce the probability of liquid oil droplets from striking hot cracking catalyst particles, it is desirable that the liquid oil feedstock and catalyst partices merge together at about the same velocity. Therefore, the particulate catalyst is preferably introduced into the riser with an axial velocity component which is about the same as the axial velocity of the liquid oil feedstock, where axial refers to the axis of the riser or transfer line, which is preferably vertically oriented. In this manner, catalyst slippage at the point of mixing with the feedstock, that is, substantial slippage prior to vaporization of the feed, can be substantially prevented.

Preferably, the particulate solid comprises a fluid catalytic cracking catalyst which will have a particle size primarily in the range of from about 20 to about 200 microns, usually in the range of from about 40 to about 80 microns. The liquid oil feedstock will generally comprise a petroleum oil having boiling point in the range of from about 600° F. to about 1200° F.+ and be introduced into the riser so as to provide a catalyst:oil weight ratio in the range of from about 2:1 to about 20:1. The liquid oil feedstock is preferably introduced generally axially into the mouth of the riser from a generally cylindrical atomization chamber positioned in general axial alignment with the riser and the fluidized cracking catalyst is usually introduced into the mouth of the riser from a catalyst lift chamber annularly positioned around the atomization chamber and physically separated from the atomization chamber. The catalyst lift chamber empties into the mouth of the riser along the circumference of the mouth. In this manner, the oil feedstock can be introduced into the mouth of the riser in atomized form with the droplet size being less than 1000 microns, preferably principally in the range of from about 5 to about 500 microns, having been atomized by being sprayed into an atomization chamber axially aligned with the mouth of the riser. The fluidized cracking catalyst is flowed into the stream of atomized oil feedstock with a substantial radially inward velocity component from the periphery of the stream. Preferably, the fluidized cracking catalyst enters the stream of atomized oil feedstock at an acute angle of between about 45 degrees and about near 90 degrees with respect to the flow axis of the atomized oil feedstock. Preferably, steam is injected into the generally annularly shaped cloud of fluidized cracking catalyst slightly upstream of its entry into the mouth to both dilute and impart a radially inward velocity component to the cracking catalyst, since steam injection at this point can aid in forming a vortex of cracking catalyst particles and atomized oil feedstock traveling up the riser. By accelerating the catalyst in three stages, a uniform dilute phase of catalyst can be achieved. For example, the catalyst can be accelerated to 3–10 fps by the bottom steam ring, 5–15 fps by the top steam ring and 10–25 fps by the annular venturi.

Generally, the cracking catalyst will be introduced into the catalyst lift chamber at a temperature in the range of from about 1000° F. to about 1700° F. and the atomization and fluidization steam will be at a temperature in the range of from about 300° F. to about 1000° F. The oil will typically have been preheated to a temperature in the range of from about 200° F. to about 800° F.

At times, it can be desirable to flow the oil feedstock and atomizing gas through a partition positioned in axial alignment with the mouth of the riser. The partition when present has a plurality of apertures therethrough which function as venturis to provide better dispersion of the oil and steam and smaller droplet size. Steam can be used as the atomizing gas with a pressure ratio across the venturi high enough to give critical flow, for example, 2 or more. Where oil impingement coalesces on the bottom of the partition or the sidewall of the oil cartridge, it can be collected in a sump positioned at the bottom of the atomization chamber and reaspirated by a tube carrying atomizing gas for emission back into the atomization zone. To reduce the possibility of coke formations on the inside walls of the atomization chamber, the atomization chamber and catalyst lift chamber can be physically separated by a hollowed out wall and a cooling fluid circulated through the hollow wall. If desired, at least a portion of the cooling fluid can be withdrawn from the hollow wall and at least a portion of it injected into the atomization chamber. Preferably, the cooling fluid comprises steam in which event a stream of steam is injected into the atomization chamber separate from the liquid oil feedstock. If desired, a separate steam stream can be introduced into the atomization chamber alternatively or in addition to the steam entering the atomization chamber from the hollowed out wall. For good distribution of the separate steam streams, they can be introduced into the atomization chamber at circumferentially spaced apart positions in the chamber. One or more radiation shield members can be positioned in the hollow wall and the cooling fluid circulated around the radiation shield members to further reduce heat leak through from the catalyst lift chamber into the atomization zone.

The invention is illustrated by the following example.

EXAMPLE

The following illustrates how the invention might be used in a commercial unit. Using the equipment described in FIGS. 1, 2, and 3 the following specific conditions can be employed.

| Item | |
|---|---|
| (34) Regenerator diameter feet-inches (I.D.) | 45'2" |
| (34) Regenerator length feet-inches | 67'8" |
| (8) Reactor (disengager) diameter feet-inches (I.D.) | 26'0" |
| (8) Reactor (disengager) length feet overall | 54'0" |
| (7) Reactor riser diameter I.D. inches | 42" |
| (7) Reactor riser height feet-inches | 88'6" |
| (37) Lift pot diameter feet-inches | 7'0" |
| (37) Lift pot height overall feet-inches | 7'11" |
| (38) Catalyst conduit diameter (I.D.) feet-inches | 2'2" |
| (39) Catalyst slide valve diameter (I.D.) feet-inches | 2'6" |

| Operating Conditions | Regenerator | Disengager | Reactor |
|---|---|---|---|
| Outlet temperature °F. | 1298 | 928 | |
| Dilute phase temperature °F. | 1312 | 900 | |
| Top pressure psia | 19.7 | 24.2 | |
| Riser inlet temperature °F. | | | 1011 |
| Riser feed temperature °F. | | | 702 |
| Riser out temperature °F. | | | 951 |
| Reactor stripper temperature °F. | | 950 | |
| Stripping steam lb/hr | | 5500 | |
| Stripping steam lb/ton catalyst | | 7.2 | |
| Riser cat/oil ratio | | | 4.3 |
| Riser Velocity feet/sec | | | 50 |
| Residence time seconds | | | 1.8 |
| Catalyst circulation tons/min | | | 12.7 |
| Total regenerator air (SCFM) | 85,300 | | |
| Air blower discharge temperature °F. | 310 | | |
| Air blower discharge pressure psia | 38 | | |

| Fresh Feed Oil Charge Volumes and Temperatures BPD, °API °F. | BPD | °API | °F. |
|---|---|---|---|
| Virgin gas oil | 10,000 | 32.8 | 750 |
| Heavy cycle oil | 7,200 | 20.3 | 780 |
| Topped crude | 8,000 | 14.0 | 800 |
| Reslurry oil | 2,400 | 10.9 | 680 |
| Precipitator backwash | 1,200 | 10.8 | 480 |
| Total fresh feed | 28,800 | — | — |
| Steam, 125 psig, 500° F. | | | |
| To V. Gas oil preheater lb/hr | 4,000 | | |
| To slurry nozzle lb/hr | 3,000 | | |
| All other cartridge stm lb/hr | 11,000 | | |
| Total steam usage | 18,000 | | |

| Lift Pot Item | Dimension |
|---|---|
| (109) Two 3-inch sch. 160 304 S S. steam rings with 21 3/16 diameter steam holes | 5 ft 6 in O.D. |
| (42) Cartridge, outside refractory diameter overall height | 4 ft 4 in<br>9 ft 5¼ in |
| (104) Inside diameter (refractory) | 2 ft 10 in |
| (102) Length of chamber | 3 ft 4 in |
| (44) 3 Heavy cycle and topped crude feed pipes nom. sch 80 typical | 4 in |
| (45) 1 Virgin gas oil feed pipe nom sch 80 | 10 in |
| (46) Dispersion steam pipes and rings 1½ inch sch. 80 with 2 ft 8 in diameter ring of 1½ inch sch. 80 with 60 3/16 inch steam holes. | 1½ in |
| (47) 3 Reslurry oil and separator backwash feed lines 4 in sch. 80 nom. diameter with interior steam pipe of 2½ in diameter sch. 160 typical | 2½ in O.D. inside<br>4 in I.D. |
| (66) Lift pot interior refractory surface | 6 ft 3 in I.D. |
| (70) Lower end of riser interior refractory I.D. | 42 in |
| (76) Upper end of cartridge rounded with ⅛ inch radius, with ⅛ inch outer layer of Stellite #1 over a ⅛ inch inner layer of Stellite #6 over a nosing bar | As described |
| (96) Catalyst acceleration zone 96 defined betweeen upper surface 92 of means 90 and surface 66 of upper end 62 of catalyst lift pot 37. | 4 to 5 inches between surface 92 and 66. Throat measures about 600 in². Surfaces converge toward axis at about a 45° angle. |
| (98) Catalyst lift chamber, annular width with annulus circumferential 360° around cartridge | 11¼ in |
| (105) Circular plate steel | 1 in thick |
| (108) Turbulence generating members welded at 15° angle io axis and pentagonally shaped with overall dimensions of 1¼ inch by 2 inch with four rows of deflectors, 16 deflectors per row, rows are staggered | |
| (110) Dispersal steam pipes of 1 to 1½ inch nominal pipe diameter. | |
| (112) Tubular member 4 inch nom. diameter (same as 114) | |
| (114) Tubular member 4 inch nom. diameter both circumferentially spaced apart 11 3/16 inch radius to center lines from central pipe 106 and extended 6 inches into chamber 102 | |
| (120) Venture partition 2 ft 10 inches in diameter, 2 inches thick with frustoconical apertures | |
| (122) 2 inch diameter converging to 1 inch diameter | |
| (130) Perforated steam ring 2 inch sch. 80 3 feet 7 inches in diameter | |
| (132) 2 Radiation shielding baffle members, perforated ⅜ inch thick steel plates cylindrical shaped, ¼ inch diameter holes, 4 inch center line distance between holes, plates are 1 inch apart, holes are misaligned | |
| (136) Steam leaks nominally ¼" to 1 inch diameter and sufficiently few in number to provide good distribution. | |
| (141) 1½ inch annular steam distributor ring 2'6" diameter | |
| (142) 1 inch port in conduit 111 which has 1½ I.D. | |
| (148) 5 feet 5 inches diameter flange 4 inches thick carbon steel with 60 1⅜ inch diameter holes on a 60 inch bolt circle | |

What is claimed is:
1. Apparatus comprising
(a) a lift pot defining a longitudinal axis, an inside diameter, a first end, a second end, and an interior surface;
(b) a line reactor having a first end and a second end with the second end connected to the first end of the lift pot, the second end of said line reactor defining a first diameter which is less than the inside diameter of the lift pot;
(c) a tubular member extending into the lift pot from the second end of the lift pot, the tubular member having a longitudinal axis, a first end being spaced from and opening toward the second end of the line reactor, an exterior surface and an interior surface, an annulus being formed between the exterior surface of the tubular member and the interior surface of the lift pot, an acceleration zone being defined between the first end of the tubular member and the first end of the lift pot;

(d) a means for causing a first material to flow generally longitudinally into the second end of the line reactor from the tubular member; and (e) a means for causing a second material to flow from substantially the entire annulus between the exterior surface of the tubular member and the interior surface of the lift pot through the acceleration zone and into the second end of the line reactor.

2. Apparatus as in claim 1 wherein the first material comprises an oil feedstock and the means for causing the first material to flow into the line reactor includes a source of oil feedstock at elevated pressure; and the second material comprises a hot fluidizable cracking catalyst and the means for causing the second material to flow into the second end of the line reactor includes a source of hot fluidizable cracking catalyst;

wherein the lift pot is a catalyst lift pot.

3. Apparatus as in claim 2 wherein the first end of the tubular member comprises a first surface longitudinally spaced beneath the first end of the catalyst lift pot a catalyst acceleration zone being defined between the first surface at the first end of the tubular member and the first end of the catalyst lift pot.

4. Apparatus as in claim 3 wherein the first end of the lift pot, the line reactor and the tubular member is an upper end, and the second end of the lift pot and the line reactor is a lower end;

the tubular member has a generally cylindrical exterior surface which defines a second diameter and the catalyst lift pot has a generally cylindrical interior surface which defines a third diameter generally concentric with the second diameter to form a catalyst lift chamber of generally annular cross-section between the exterior surface of the tubular member and the interior surface of the lift pot, and the upper end of the catalyst lift pot is formed by a wall which connects the generally cylindrical interior surface of the catalyst lift pot with the lower end of the line reactor which is generally vertically oriented so as to comprise a riser reactor, the upper end of the tubular member comprising the first surface which is longitudinally spaced beneath the upper end of the lift pot and generally juxtaposed to the wall.

5. Apparatus as in claim 4 wherein the lift pot has a port at its lower end adapted for receiving the generally cylindrical exterior surface of the tubular member and a generally annular flange positioned around the port, and the generally cylindrical exterior surface of the tubular member has a generally annular flange mounted thereon sealingly contacting the generally annular flange at the lower end of the lift pot.

6. Apparatus as in claim 4 further comprising a means positioned in the catalyst lift chamber for distributing a fluidizing gas into the catalyst lift chamber adjacent a lower end thereof and a port through the sidewall of the lift pot between the means for distributing fluidizing gas and the catalyst acceleration zone for introducing particulate catalyst into the catalyst lift chamber.

7. Apparatus as in claim 6 further comprising a second means positioned in the catalyst lift chamber for distributing a fluidizing gas into the catalyst lift chamber at a position adjacent the catalyst acceleration zone.

8. Apparatus as in claim 7 wherein each of said first means and second means for distributing fluidizing gas comprises an annular distributor having a sidewall with a plurality of ports therethrough connecting its interior with circumferentially spaced apart positions in the catalyst lift chamber.

9. Apparatus as in claim 8 further comprising a source of fluidizing gas connected to each of said annular distributors, wherein the ports through the sidewall of the annular distributor for introducing fluidizing gas into the catalyst lift chamber adjacent the lower end thereof are oriented to lift the catalyst to the catalyst acceleration zone and the ports in the annular distributor adjacent the catalyst acceleration zone are oriented toward the lower end of the riser-reactor.

10. Apparatus as in claim 4 wherein the wall at the upper end of the catalyst lift pot connecting the generally cylindrical interior surface of the catalyst lift pot with the lower end of the riser reactor is generally frustoconical in shape and converges toward a longitudinal axis of the riser reactor at an angle as measured between the longitudinal axis and the wall of between about 15 degrees and about 80 degrees and the first surface at the upper end of the tubular member is generally frustoconically shaped and converges toward the longitudinal axis of the riser reactor at an angle as measured between the longitudinal axis and the first surface of between about 15 degrees and about 80 degrees.

11. Apparatus as in claim 10 further comprising a wall across the inside of the tubular member spaced apart from the upper end of the tubular member forming an atomization chamber end wall wherein the inside of the tubular member forms a generally cylindrical atomization chamber having a fourth diameter which is in the range of from about 0.5 to about 1 times the first diameter at the lower end of the riser reactor and a length-:diameter ratio in the range of 1:10 to about 10:1 where the length is measured longitudinally between the upper end of the tubular member and the atomization chamber end wall spaced apart from the upper end of the tubular member wherein the generally frustoconical surfaces converge toward the longitudinal axis of the riser reactor at about the same angle in the range of from about 30 degrees to about 75 degrees and the second diameter defined by the exterior surface of the tubular member is in the range of from about 1 to about 2 times the first diameter defined at the lower end of the riser.

12. Apparatus as in claim 11 further comprising a central pipe extending through the atomization chamber end wall along the axis thereof and emptying into the atomization chamber; a plurality of tubular members circumferentially spaced apart around the central pipe extending longitudinally through the end wall and emptying into the atomization chamber; a source of atomizing fluid connected to the central pipe; and a source of oil feedstock connected to the plurality of tubular members.

13. Apparatus as in claim 11 further comprising a partition having a plurality of apertures therethrough, said partition being positioned across the tubular member between the end wall of the tubular member and the upper end of the tubular member and defining an upper end of the atomization chamber.

14. Apparatus as in claim 13 wherein said partition has a thickness in the range of 0.5-10 inches and at least a portion of the apertures converge from an inlet diameter in the range of 0.25 inches to about 5 inches adjacent the atomization chamber to a throat diameter in the range of 0.1 inches to about 3 inches, and sufficient apertures are provided so that the total aperture throat cross-sectional area is in the range of from about 0.05 to about 0.5 times the cross-sectional area of the atomization chamber.

15. Apparatus as in claim 11 further comprising a means extending through the end wall of the atomization chamber for introducing an atomizing fluid consisting essentially of steam into the atomization chamber.

16. Apparatus as in claim 15 wherein said means for introducing atomizing fluid comprises a plurality of ducts which open into the atomization chamber in a geometric array which is concentric with the longitudinal axis of the atomization chamber.

17. Apparatus as in claim 16 wherein the outlet ends of the ducts are arranged in a circular configuration.

18. Apparatus as in claim 17 wherein the ducts are connected to a steam source and further comprising a means for controlling the flow of steam through the ducts.

19. Apparatus as in claim 11 further comprising a sump recessed into the end wall defining the lower end of the atomization chamber, said end wall being formed so that liquids accumulated thereon flow into the sump.

20. Apparatus as in claim 19 further comprising a means associated with the sump for atomizing accumulated liquids therein.

21. Apparatus as in claim 20 wherein the atomizing means associated with the sump comprises a duct opening into the sump, said duct being connected to a steam source.

22. Apparatus as in claim 20 wherein the atomizing means comprises a tubular member extending through the end wall of the atomization chamber passing through the sump and emptying into the atomization chamber, said tubular member having a sidewall with a port therethrough, the port located in the sump so as to aspirate liquids out of the sump, the aspirated liquids in admixture with steam being emitted from the end of the tubular member into the atomization chamber.

23. Apparatus as in claim 11 wherein the tubular member is defined by a hollowed out sidewall, said sidewall being formed by an inner wall member which defines the fourth diameter and an outer wall member which defines the second diameter, said inner wall member and said outer wall member being connected by the first surface at the upper end of the tubular member; the lower end wall of the atomization chamber being defined by a closure across the inside diameter of the inner wall member of the tubular member.

24. Apparatus as in claim 23 further comprising a plurality of radiation shielding members positioned between the inner wall member and the outer wall member to provide radiation shielding between the outer wall member and the inner wall member.

25. Apparatus as in claim 23 further comprising a source of cooling fluid connected to an annulus between the inner wall member and the outer wall member so that cooling fluid flows in the annulus by the outer wall member and the end wall at the upper end of the tubular member.

26. Apparatus as in claim 25 wherein the source of cooling fluid comprises an annular fluid distributor having a sidewall and a plurality of ports through its sidewall at spaced apart positions along its length connected to a fluid source, said distributor positioned in the annulus between the inner wall member and the outer wall member at a position closely adjacent the end wall at the upper end of the tubular member.

27. Apparatus as in claim 25 further comprising a generally tubular partition positioned in the annulus between the inner wall member and the outer wall member in a spaced apart position from the end wall at the upper end of the tubular member to form an inner flow path and an outer flow path with communication being established between the inner flow path and the outer flow path adjacent the end wall, the source of cooling fluid being connected to a lower portion of the inner flow path.

28. Apparatus as in claim 25 wherein the atomization chamber is in flow communication with the annulus between the inner wall member and the outer wall member via a plurality of ports which extend through the end wall which defines the lower end of the atomization chamber.

29. Apparatus as in claim 28 wherein the plurality of ports open into the atomization chamber through the end wall around the periphery of the atomization chamber closely adjacent to inner wall member.

* * * * *